United States Patent [19]

Maruyama et al.

[11] Patent Number: 5,562,571

[45] Date of Patent: Oct. 8, 1996

[54] LOCKUP CLUTCH RELEASED THEN RE-ENGAGED DURING DECELERATION CONTROL METHOD

[75] Inventors: Ikuo Maruyama, Kameoka; Yoshimasa Nagayoshi, Kyoto; Hisaji Nakamura, Kyoto; Yoichi Furuichi, Kyoto; Koichi Kato, Yokohama; Sadamu Oyaide; Takaki Yamauchi, both of Okazaki; Takeshi Asano, Kusatsu, all of Japan

[73] Assignee: Mitsubishi Jidosha Kogyo Kabushiki Kaisha, Tokyo, Japan

[21] Appl. No.: 284,145

[22] Filed: Aug. 2, 1994

[30] Foreign Application Priority Data

Aug. 4, 1993 [JP] Japan .................... 5-193714
Dec. 28, 1993 [JP] Japan .................... 5-338536

[51] Int. Cl.$^6$ ............................................. F16H 61/14
[52] U.S. Cl. ..................... 477/174; 477/62; 477/175; 477/176
[58] Field of Search ......................... 477/62, 64, 70, 477/86, 106, 174, 175, 176, 180

[56] References Cited

U.S. PATENT DOCUMENTS 4,660,697  4/1987  Yoneda et al. .................... 477/175
5,086,889  2/1992  Nobumoto et al. ............... 477/176 X

FOREIGN PATENT DOCUMENTS 402046366  2/1990  Japan .................... 477/176
402253047  10/1990  Japan .................... 477/175
5-99327  4/1993  Japan .
405087234  4/1993  Japan .................... 477/176
405133468  5/1993  Japan .................... 477/174
405231530  9/1993  Japan .................... 477/62
94018477  8/1994  WIPO .................... 477/176

Primary Examiner—Khoi Q. Ta

[57] ABSTRACT

A method is provided for the control of the state of engagement of a damper clutch arranged in association with a vehicle engine, which has a fuel cut mechanism for suspending a supply of fuel during a decelerated operation, to permit connection between an input member and an output member in a torque converter arranged on an output side of the engine. Upon detection of a decelerated operation of the engine, the damper clutch is controlled to bring the input member and output member into a desired state of engagement. Here, the damper clutch is first released for a predetermined time and is then moved to an engaged side. Next, the damper clutch is feedback-controlled into a desired slip state so that the input member and the output member are allowed to rotate with a desired difference in revolution speed therebetween. A system for practicing the method is also described.

24 Claims, 10 Drawing Sheets

LOCKUP CLUTCH RELEASED THEN RE-ENGAGED DURING DECELERATION CONTROL METHOD

BACKGROUND OF THE INVENTION a) Field of the Invention

This invention relates to a method and system for the control of a clutch for a fluid coupling, which clutch is suited for use in controlling a torque converter and a clutch arranged in association with an automatic transmission for a vehicle.

b) Description of the Related Art

An automatic transmission for an automotive vehicle generally includes a shift mechanism constructed of planetary gears, so that sun gears, planetary gears and the like are selectively driven or made standstill by hydraulic friction engagement elements, such as a hydraulic wet multi-plate clutch and hydraulic band brakes, to obtain a desired speed range. Further, a torque converter as a fluid coupling is interposed between an engine and the shift mechanism, whereby the torque converter transmits an engine torque at an increased rate to the shift mechanism upon starting or the like or absorbs a shock upon shifting, sudden acceleration or deceleration, or the like.

An automatic transmission, however, has a drawback that the fuel consumption is poorer compared with a manual transmission because the automatic transmission is operated with a slip in a torque converter. To overcome this drawback, many of recent automatic transmissions are provided with a lockup clutch (hereinafter referred to as a "damper clutch") in a torque converter so that in a predetermined drive range, an input shaft (namely, an output shaft on a side of an engine) and an output shaft (namely, an input shaft on a side of a shift mechanism) of the torque convertor are connected directly. Operation modes of the damper clutch include, in addition to a non-slip direct connection mode in which the input shaft and the output shaft are completely connected together during power-on running at relatively high revolutions, a deceleration-time slip mode in which the input shaft and the output shaft are connected together with a small degree of slipping therebetween during decelerated running, as well as a slip mode in which the input shaft and the output shaft are connected together during power-on running at relatively low revolutions while allowing the input shaft and the output shaft to slip as many as about several tens rotations per minute.

A sufficient pressure (i.e., a high hydraulic pressure) is applied to avoid slipping of the damper clutch in the non-slip direct connection mode, whereas in each of the deceleration-time slip mode and the slip mode, an apply (i.e., engaging) pressure which has been suitably regulated (to a low hydraulic pressure), through a damper clutch control valve (hereinafter simply referred to as the "control valve"), to achieve a target slip amount is applied to the damper clutch.

In general, a spool valve is employed as the control valve and the spool valve is operated by a control hydraulic pressure, duty-controlled by a solenoid valve. When changing from a non-slip direct connection range or a non-direct connection range to a deceleration-time slip range or a slip range, the solenoid valve is temporarily driven at a predetermined drive duty ratio and is then feedback controlled to achieve a target slip amount. Upon this feedback control, the hydraulic pressure is gradually corrected from a preset feedback control initiating hydraulic pressure to obtain a desired connecting hydraulic pressure.

The term "duty ratio" as used herein means a drive duty ratio of a solenoid valve. This duty ratio indicates the percentage of a time during which the drive valve is activated. For example, "70% duty ratio" means that the solenoid valve is activated for only 0.7 second out of 1 second. Similarly, "10% duty ratio" means that the solenoid valve is activated for only 0.1 second out of 1 second.

In the case of a valve which is closed while a solenoid valve is not being activated but is opened upon activation of the solenoid valve, the drive duty ratio of the solenoid valve indicates the percentage of a time, during which the valve is opened, per unit time. In the case of a valve which remains open while a solenoid valve is not being activated but is closed upon activation of the solenoid valve, the drive duty ratio of the solenoid valve indicates the percentage of a time, during which the valve is closed, per unit time.

In the embodiment of the present invention to be described subsequently herein, the drive duty ratio of a solenoid valve indicates the percentage of a time, during which a valve for feeding an apply pressure, per unit time so that the duty ratio corresponds to the apply pressure.

The above-mentioned feedback control initiating hydraulic pressure has heretofore been determined based on a relationship between the drive duty ratio of the solenoid valve and an apply pressure as ascertained through an experiment or the like.

In automatic transmissions, however, the drive duty ratio for obtaining a desired pressure to be applied generally varies to a considerable extent from one transmission to another for differences in the shift mechanism, control valves and the like among individual transmissions and also manufacturing errors in solenoid valves. In addition, a pressure required to achieve a direct connection may by itself vary due to wearing or the like of individual members in the course of use over a long period of time.

When a solenoid valve whose drive duty ratio has been shifted to a lower side is used, for example, a hydraulic pressure higher than that needed is outputted if the solenoid valve is driven at an ordinary feedback control initiating duty ratio. This results in a sudden engagement of the clutch, thereby involving the potential problem that a shock may occur. It is therefore necessary to set the feedback control initiating hydraulic pressure at a sufficiently low value.

When a solenoid valve whose drive duty ratio has been shifted to a higher side is used, on the other hand, it takes a relatively long time until the deceleration-time slip mode or the slip mode is actually achieved even if feedback control is initiated. This makes it difficult to effectively reduce fuel consumption.

SUMMARY OF THE INVENTION

With the drawbacks in view, the present invention has as a primary object thereof the provision of a method and system for the control of a clutch for a fluid coupling, which method and system make it possible to perform deceleration-time slip control so that upon deceleration of a vehicle, a fuel cut (i.e., reduction) period is prolonged to improve the fuel consumption by preventing the engine speed from being promptly reduced and further to perform the deceleration-time slip control without causing a shock, stalling or the like of a drive system.

To achieve the above object, the present invention provides the following method and system for the control of a clutch for a fluid coupling:

A method for controlling the state of engagement of a clutch arranged in association with a vehicle engine, which has a fuel cut (i.e., reduction) mechanism for suspending a supply of fuel during a decelerated operation, to permit connection between an input member and an output member in a fluid coupling arranged on an output side of the engine, which comprises the following steps:

detecting a decelerated operation of the engine; and controlling the clutch to bring the input member and the output member into a desired state of engagement upon detection of the decelerated operation of the engine in the detection step, wherein said deceleration-time clutch controlling step comprises the following steps:

releasing the clutch for a predetermined time upon detection of the decelerated operation of the engine in the detection step, moving the clutch toward an engaged side subsequent to the clutch releasing step, and feedback controlling the clutch subsequent to the clutch moving step so that the input member and the output member are brought into a slip engaged state with a desired difference in rotational speed therebetween.

A system for controlling the state of engagement of a clutch to permit connection between an input member and an output member in a fluid coupling arranged on an output side of a vehicle engine having a fuel cut (i.e., reduction) mechanism for suspending a supply of fuel during a decelerated operation, which comprises:

means for detecting a decelerated operation of the engine; and means for controlling the clutch to bring the input member and the output member into a desired state of engagement upon detection of the decelerated operation of the engine by the detecting means, wherein said deceleration-time clutch controlling means comprises:

means for releasing the clutch for a predetermined time upon detection of the decelerated operation of the engine by the detection means, means for moving the clutch toward an engaged side subsequent to the release of the clutch by the clutch releasing means, and deceleration-time slip control means for feedback controlling the clutch subsequent to the movement of the clutch by the clutch moving means so that the input member and the output member are brought into a slipped state with a desired difference in rotational speed therebetween.

DESCRIPTION OF THE PREFERRED EMBODIMENT

The method and system according to one embodiment of the present invention for the control of a clutch for a fluid coupling will hereinafter be described with reference to the drawings.

Figure 2:
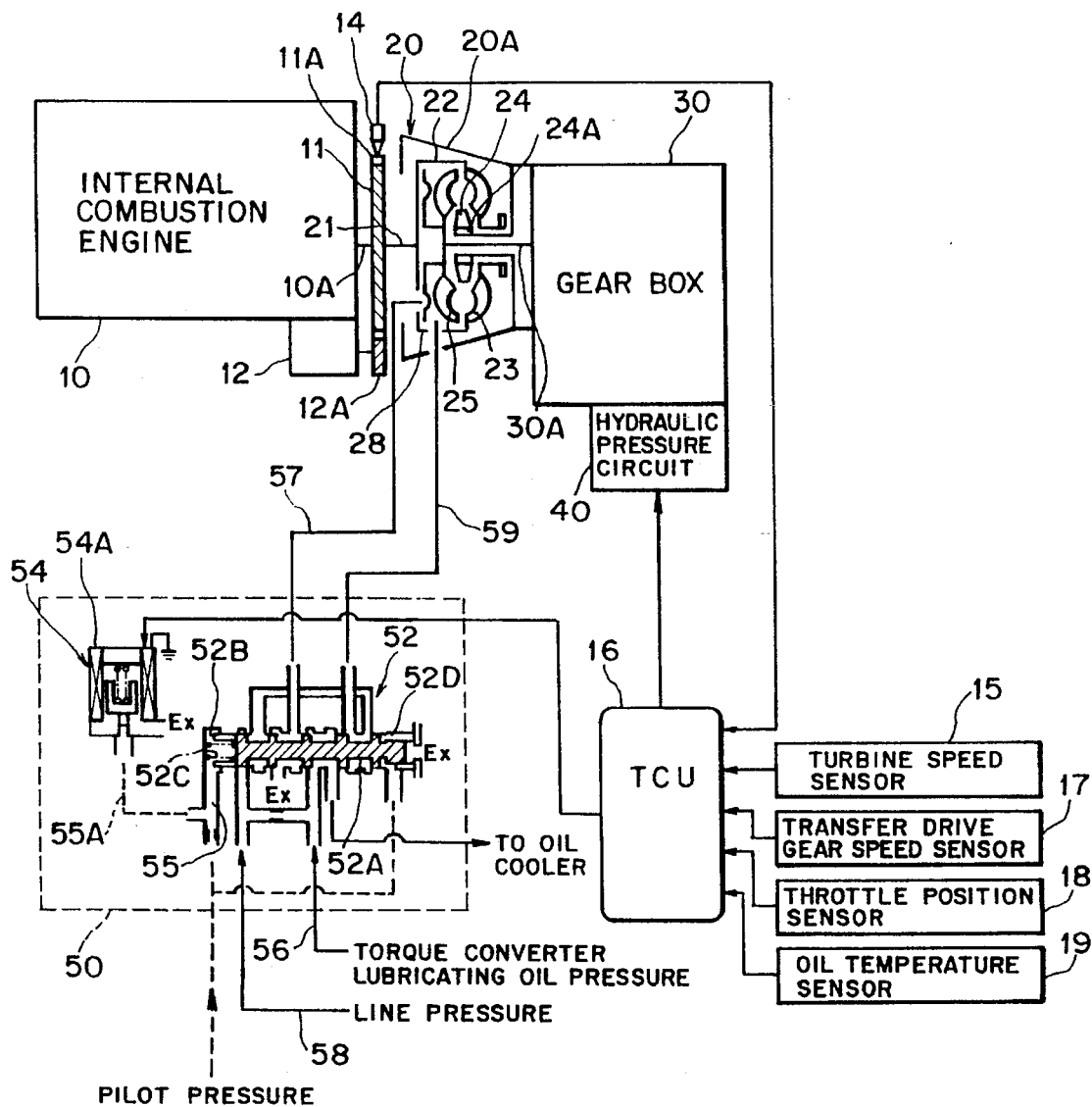
FIG. 2 is an overall block diagram showing an engine system which relates to the control method and system according to one embodiment of the present invention for the control of a clutch for a fluid coupling.

An engine system on which the control system of this embodiment is mounted is constructed as shown in FIG. 2, in which a flywheel 11 is mounted on a crank-shaft 10A of an internal combustion engine 10 and a drive shaft 21 of a torque converter 20, as a fluid coupling forming a part of a transmission, is connected at one end thereof to the crank-shaft 10A via the flywheel 11.

The torque converter 20 is equipped with a casing 20A, a pump 23, a stator 24 and a turbine 25. The pump 23 is connected to an opposite end of the drive shaft 21 by way of a damper-clutch-inputting casing 22, whereas the stator 24 is connected to the casing 20A via a one-way clutch 24A.

Further, the turbine 25 is connected to an input shaft 30A of a gearbox 30.

The torque converter 20 is additionally provided with a slippable direct-connection clutch 28 as a clutch for a fluid coupling. (This clutch 28 will hereinafter be called a "damper clutch".) The damper clutch 28 is arranged so that a solid connection can be made between an input side and an output side of the torque converter 20.

Described specifically, the damper clutch 28 is interposed between the damper-clutch-inputting casing 22 and the turbine 25, and is constructed in such a way that direct mechanical connection can be established between the pump 23 and the turbine 25 in the torque converter 20 while permitting a predetermined slip therebetween even during engagement (direct connection).

A control system is also provided to control the torque converter 20 and the damper clutch 28. The amount of slip of the damper clutch 28 and the torque to be transmitted through the damper clutch can be controlled externally by a damper clutch hydraulic pressure control circuit 50.

The damper clutch hydraulic pressure control circuit 50 is provided with a damper clutch control valve 52 and a damper clutch control solenoid valve 54. The damper clutch control solenoid valve 54 is constructed as a normally-closed on-off valve and its solenoid 54A is electrically connected to a transmission control unit (hereinafter abbreviated as "TCU") 16.

The damper clutch control valve 52 is constructed to change over the line for working oil to be fed to the damper clutch 28 and also to control the hydraulic pressure to be applied to the damper clutch 28.

Namely, the damper clutch control valve 52 is constructed of a spool 52A, a left-end compartment 52B capable of receiving therein a left-hand end portion of the spool 52A as viewed in FIG. 2, and a spring 52C pressing the spool 52A rightwards as viewed in FIG. 2.

A pilot line 55 which is in communication with an unillustrated pilot hydraulic pressure source is connected to the left-end compartment 52B of the damper clutch control valve 52.

A by-pass line 55A which is communicated to a drain side is connected to the pilot line 55 and a damper clutch control solenoid valve 54 is inserted in the by-pass line 55A, so that a pilot hydraulic pressure to be supplied to the left-end compartment 52B can be controlled in magnitude by either opening or closing the damper clutch control solenoid valve 54.

Further, a right-end compartment 52D into which a right-hand end portion of the spool 52A advances can also be fed with a hydraulic pressure from the pilot hydraulic pressure source.

When a pilot hydraulic pressure is applied to the left-end compartment 52B and the spool 52A of the damper clutch control valve 52 is caused to move to right-hand dead-end position as viewed in FIG. 2, a lubricating hydraulic pressure supplied to the torque converter 20 is fed through a line 56, the damper clutch control valve 52 and then a line 57 into a hydraulic pressure compartment formed between the input casing 22 and the damper clutch 28, whereby the damper clutch 28 is released from engagement.

Namely, a release pressure for releasing engagement of the damper clutch 28 is applied through the line 57.

When the left-end compartment 52B is not supplied with the pilot hydraulic pressure and the spool 52A moves to a left-hand dead-end position as viewed in FIG. 2, a line pressure from an unillustrated hydraulic pump is fed to a hydraulic pressure compartment formed between the damper clutch 28 and the turbine 25 by way of a line 58, the damper clutch control valve 52 and a line 59 so that the damper clutch 28 is brought into frictional engagement with the casing 22.

Namely, an apply pressure which acts to directly connect the damper clutch 28 is caused to act through the line 59.

When the duty ratio DC of the damper clutch control solenoid valve 54 is controlled by TCU 16, the spool 52A moves to a position where the resulting force of the pilot hydraulic pressure acting on the left-end compartment 52B and the spring force of the spring 52C is balanced with the pilot hydraulic pressure acting on the right-end compartment 52D. A hydraulic pressure corresponding to this moved position of the spool 52A is hence fed to the damper clutch 28 so that a torque TC to be transmitted via the damper clutch 28 is controlled at a desired value.

Incidentally, a ring gear 11A which rotates in mesh with a pinion 12A of a starter 12 is externally fitted on an outer periphery of the flywheel 11. This ring gear 11A is provided with a predetermined number of teeth. In opposition to the ring gear 11A, an electromagnetic pickup 14 is additionally disposed as an engine speed sensor.

The electromagnetic pickup (hereinafter called the "NE sensor") 14 serves to detect an engine speed NE of the internal combustion engine 10 and is electrically connected to an input side of TCU 16.

Also connected to the input side of TCU 16 are a turbine speed sensor (NT sensor) 15 for detecting a speed NT of the turbine 25 in the torque converter 20, a transfer drive gear speed sensor (N0 sensor) 17 for detecting a speed N0 of a transfer drive gear (not shown), a throttle position sensor (θT sensor) 18 for detecting a valve position θT of a throttle valve disposed in an unillustrated air intake passage of the internal combustion engine 10, an oil temperature sensor 19 for detecting an oil temperature TOIL of working oil to be delivered from a hydraulic pump (not shown), etc. Therefore, detection signals from the individual sensors are fed to TCU 16.

Although not shown in the drawing, TCU 16 is internally equipped with memories such as ROM or RAM, a central processing unit, an I/O interface, a counter and the like. As will be described next, TCU 16 is designed to perform shifting hydraulic pressure control in accordance with a program stored in the memory.

Figure 12:
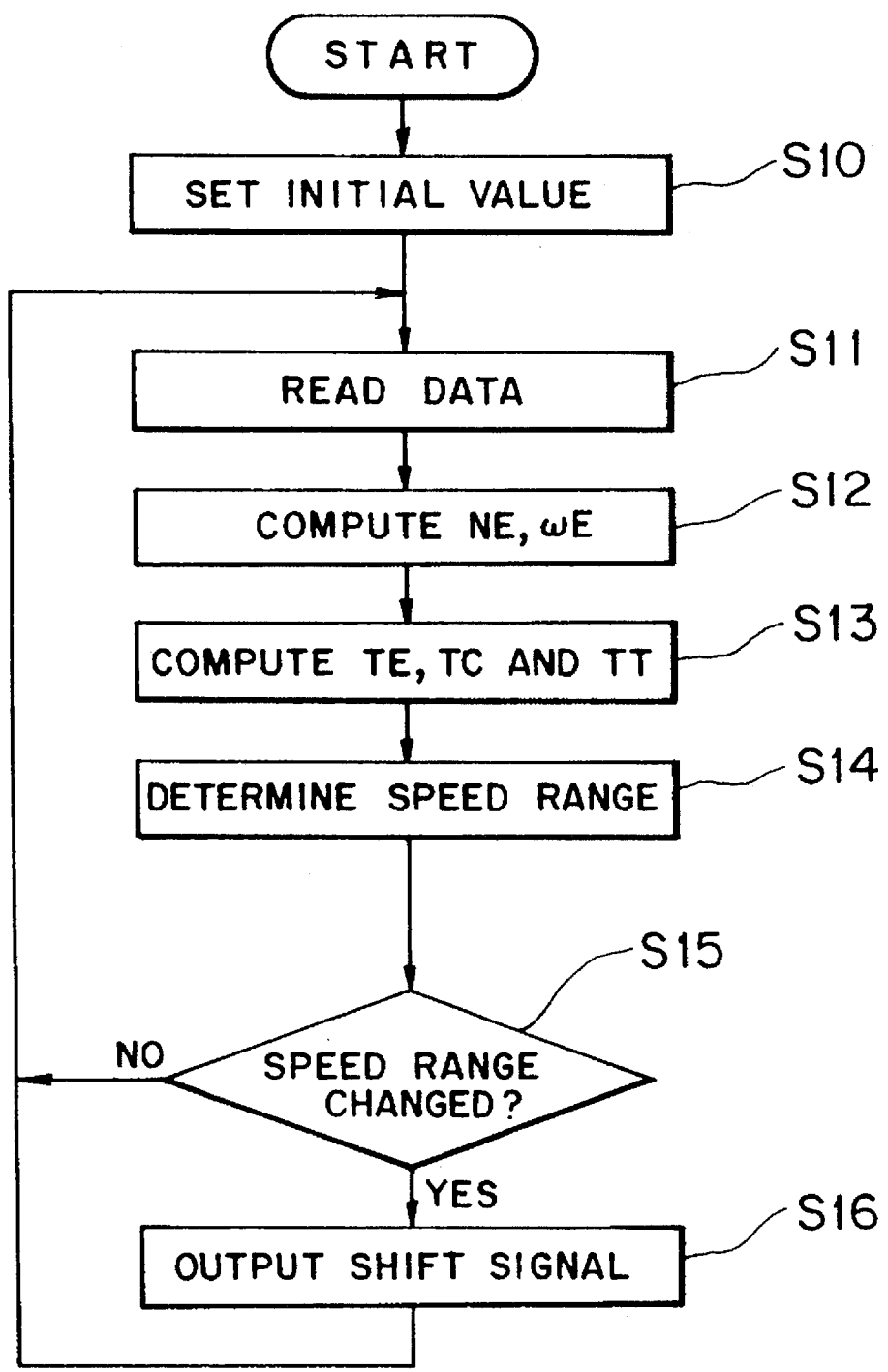
FIG. 12 is a flow chart illustrating a main program routine performed by a transmission control unit (TCU)
Figure 13:
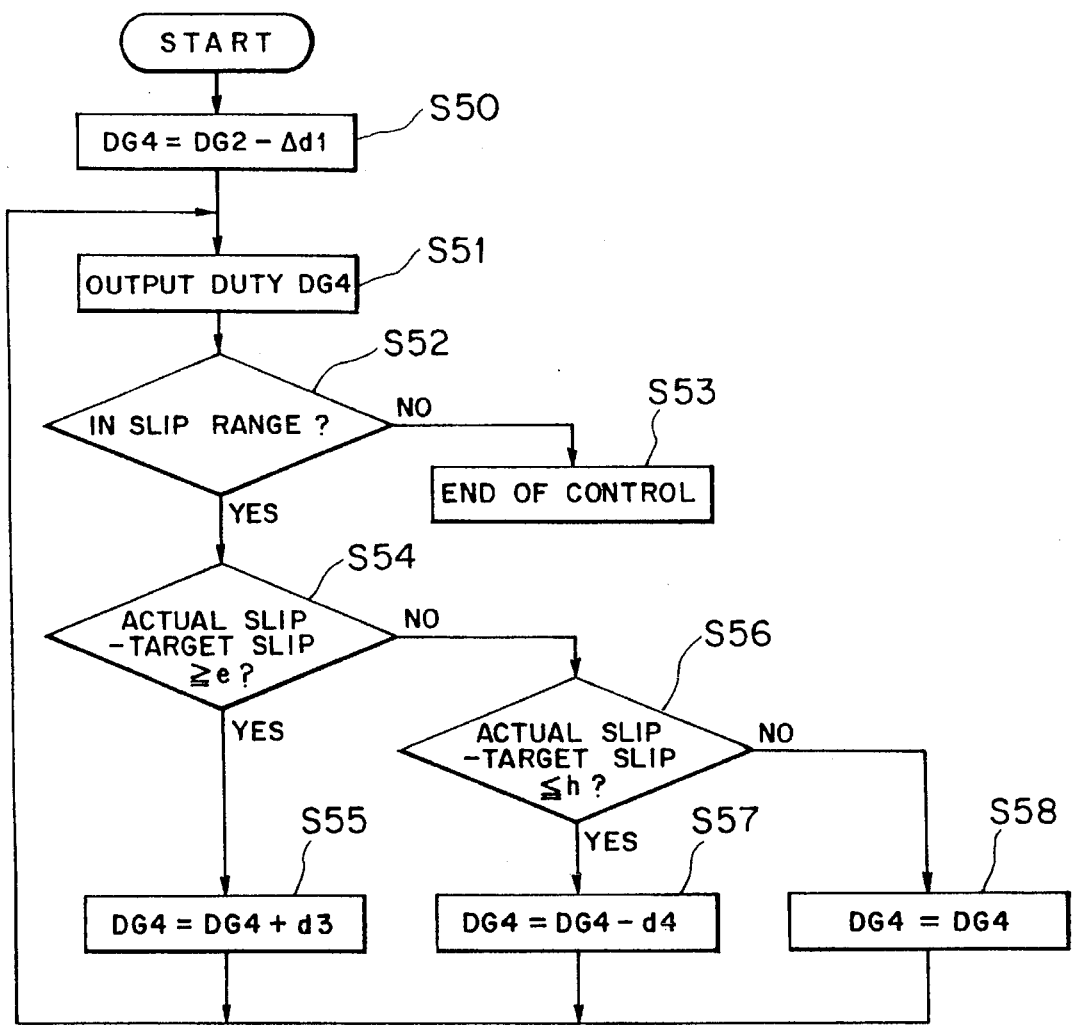
FIG. 13 is a flow chart showing a slip control routine.

TCU 16 repeatedly performs at a predetermined interval, for example, at an interval of 35 HZ the main program routine which is shown in FIG. 12.

In this main program routine, reading or setting of various initial values to be described subsequently herein is first performed in step S10. TCU 16 next reads and stores detection signals from various sensors, namely, the NE sensor 14, the NT sensor 15, the N0 sensor 17, the θT sensor 18, the oil temperature sensor 19, and the like (step S11).

TCU 16 then computes an engine speed NE and a change rate ωE of the engine speed NE from detection signals from the NE sensor 14 (step S12).

While the ring gear 11A undergoes a full rotation, the NE sensor 14, whenever four teeth of the ring gear 11A are detected, generates one pulse signal and feeds it to TCU 16 so that the engine speed NE and the change rate ωE of the engine speed NE can be computed.

TCU 16 next computes in step S13 an output torque TE of the engine and a torque TT of the output shaft of the torque converter.

Here, the relationship among a frictional torque TB of the clutch on a released or engaged side, a turbine shaft torque TT and a turbine speed change rate ωT during shifting can be expressed by the following formula (1):

$$TB = A \cdot TT + B \cdot \omega T \quad (1)$$

where A and B are constants which can be determined by a shift pattern (the kind of a shift), such as an upshift from the 1st speed to the 2nd speed or a downshift from the 4th speed to the 3rd speed, inertia moments of individual rotating parts, etc.

Using an engine output torque TE computed in accordance with the following formula (3), the turbine shaft torque TT is then computed in accordance with the following formula (4). These computed values are stored in the memory described above $$TE = C \cdot NE^2 + TC \qquad (2)$$

$$\begin{aligned} TT &= T(TE - TC) + TC \qquad (3) \\ &= T \cdot C \cdot NE^2 + TC \end{aligned}$$

where TE is a torque obtained by subtracting a friction loss, an oil pump drive torque and the like from an average torque produced by expansion in the internal combustion engine 10, and C is a torque capacity coefficient and is read from a torque converter characteristic table, which has been stored in advance in the memory, in accordance with a speed ratio E (= NT/NE) of the turbine speed NT to the engine speed NE.

Accordingly, after computing the speed ratio E from the turbine speed NT detected by the NT sensor 15 and the engine speed NE detected by the NE sensor 14 as described above, the torque capacity coefficient C corresponding to the speed ratio E so computed is read from the memory.

T represents a torque ratio. This is also read from the torque converter characteristic table, which has been stored in advance in the memory, in accordance with the speed ratio E of the turbine speed NT to the engine speed NE.

TC is a torque transmitted through the damper clutch 28. In a slippable direct-connection clutch of this type, the torque TC can be given by the following formula (4):

$$\begin{aligned} TC &= Pc \cdot AR \cdot R \cdot \mu \qquad (4) \\ &= A1 \cdot DC - B1 \end{aligned}$$

where,

PC: hydraulic pressure fed to the damper clutch 28,

AR: pressure-receiving area of the piston of the damper clutch 28,

R: frictional radius of the damper clutch 28, and

μ: friction coefficient of the damper clutch 28.

Since the hydraulic pressure fed to the damper clutch 28 is proportional to the duty ratio DC of the damper clutch control solenoid valve 54, the above formula (4) has been derived.

Incidentally, A1 and B1 are constants which are set depending on the shift mode. Further, the value of TC which is computed according to the formula (4) is effective where it is positive, but is set at 0 (TC=0) where it is negative.

In the above-described manner, instantaneous values of the engine torque TE and turbine shaft torque TT are computed and determined depending on an engine speed NE detected by the NE sensor 14, a turbine speed NT detected by the NT sensor 15 and a duty ratio DC of the damper clutch control solenoid valve 54.

From a valve position θT of the throttle valve and a transfer drive gear speed N0, TCU 16 then determines in step S14 a speed range to be established at the gear-box 30.

Next, TCU 16 determines whether or not the speed range determined to be established in step S14 is different from the result determined in the preceding cycle (step S15). When not different, the routine returns to step S11 and step S11 onwards are executed repeatedly. When different, a shift signal corresponding to a shift pattern of the result determined in step S14 is outputted (step S16) and the routine then returns to step S11.

Upon receipt of the signal outputted in step S16, power on/off hydraulic control is performed by TCU 16 and the hydraulic circuit 40 so that the shifting is controlled.

Figure 1:
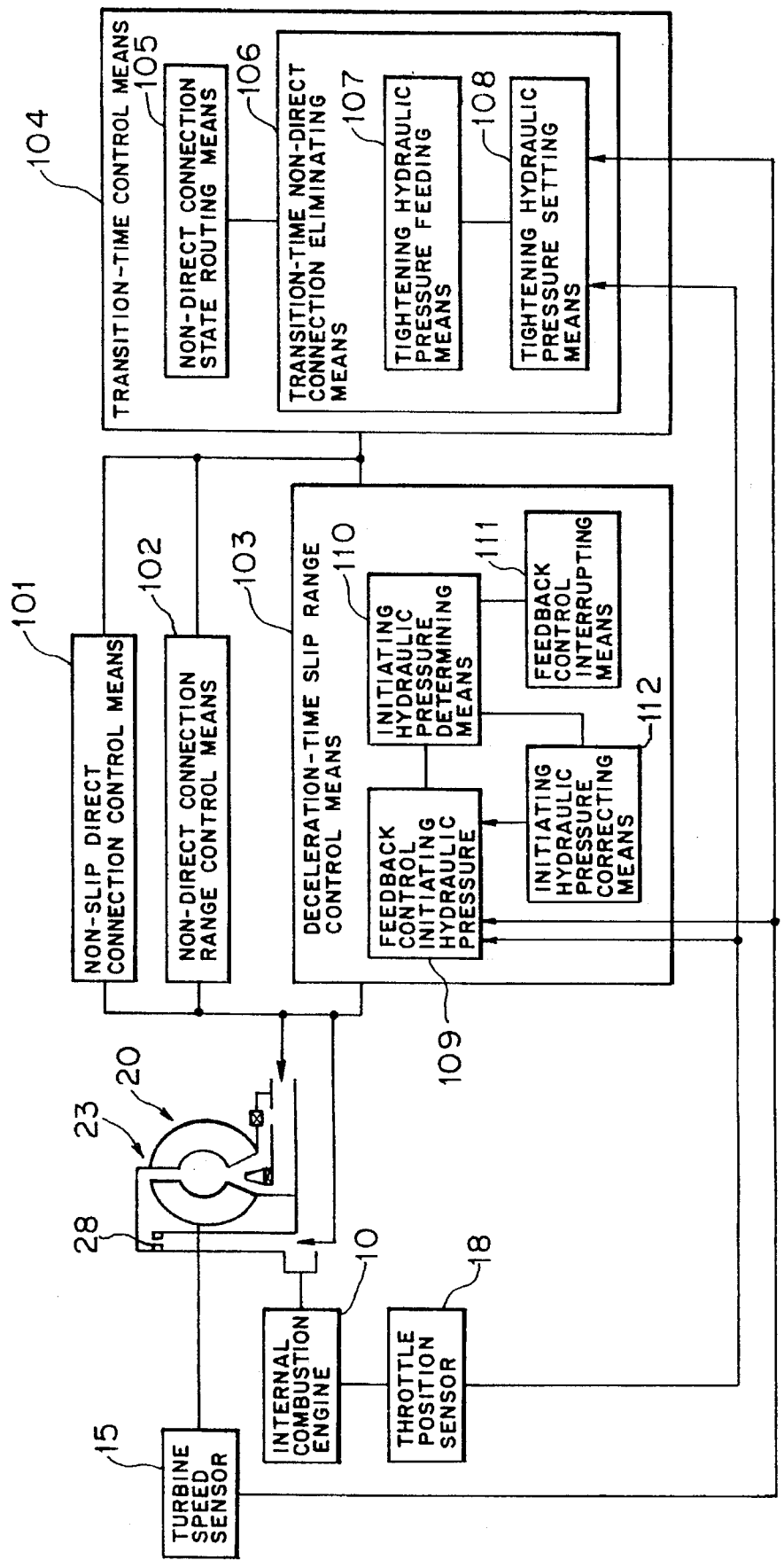
FIG. 1 is a control block diagram showing a method and system according to one embodiment of the present invention for the control of a clutch for a fluid coupling, in which the method and system are described by focusing their control function.

Incidentally, the functional construction of the control system for the damper clutch 28 is designed as shown in FIG. 1. By control signals outputted as a result of the prescribed computations at TCU 16, the damper clutch hydraulic pressure control circuit 50 is actuated to perform control as needed.

Described specifically, non-slip direct connection control means 101 is arranged to control the damper clutch 28 in a solid connection state. When operated in the non-slip direct connection range shown in FIG. 6, the non-slip direct connection control means 101 feeds a predetermined apply pressure to the damper clutch 28 through the line 59 in response to a control signal from TCU 16, so that the damper clutch 28 is brought into a predetermined solid connection state and the operation is hence performed relying primarily on a drive force transmitted via the damper clutch 28.

Figure 6:
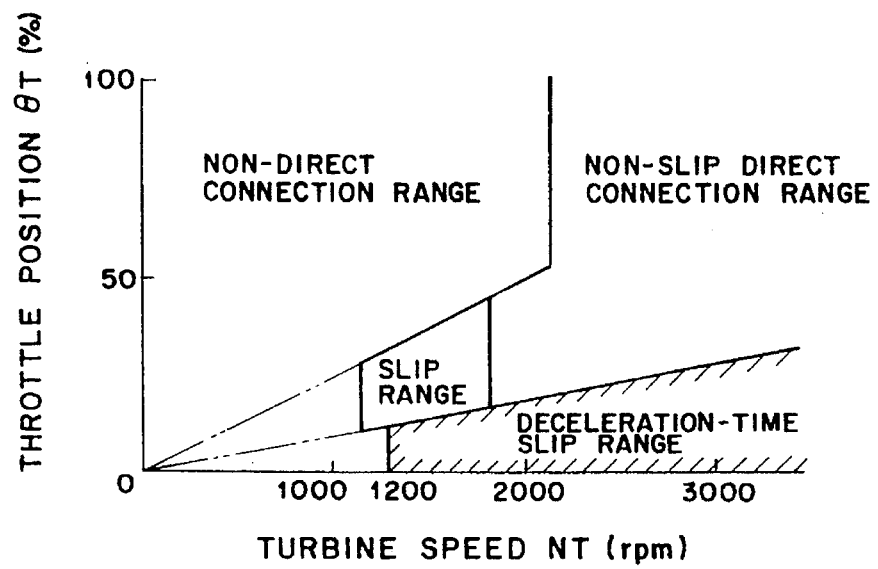
FIG. 6 is a diagram showing various operation ranges defined by the turbine speed and the throttle position.

The characteristic diagram of FIG. 6 classifies operation states in accordance with the speed of the turbine 25 plotted along the axis of abscissas and the throttle position plotted along the axis of ordinates. When from a turbine speed NT detected by the NT sensor 15 and a throttle position θT detected by the θT sensor 18, an operation state is found to fall in the non-slip direct connection range in the diagram, control is performed by the non-slip direct connection control means 101.

Further, non-direct connection range control means 102 is also provided to control the damper clutch 28 in a non-direct connection state.

When operated in the non-direct connection range shown in FIG. 6, the non-direct connection range control means 102 feeds a predetermined release pressure to the damper clutch 28 through the line 57 in response to a control signal from TCU 16, so that the damper clutch 28 is brought into a predetermined non-direct connection state and the operation is performed relying primarily upon a drive force transmitted via the torque converter 20.

In the slip range shown in FIG. 6, the non-slip direct connection control means 101 and the non-direct connection range control means 102 cooperate with each other to regulate an apply pressure and a release pressure, whereby operation control is performed with a predetermined degree of slipping.

Deceleration-time slip range control means 103 is also arranged to perform feedback control of the damper clutch 28 in a predetermined deceleration-time slip state during decelerated operation of the automotive vehicle.

When operated in the deceleration-time slip range shown in FIG. 6 (equivalent to decelerated operation of a vehicle), the deceleration-time slip control means 103 feeds a predetermined apply pressure through the line 59 and a predetermined release pressure through the line 57 in response to a control signal from TCU 16, so that the damper clutch 28 is brought into a predetermined connection state and the operation is hence performed relying primarily upon a drive force transmitted via the damper clutch 28.

The deceleration-time slip range, in which the deceleration-time slip range control means 103 is actuated, is set to an operation state defined by speeds NT of the turbine 25 greater than a predetermined value (for example, 1,200 rpm and higher) and throttle positions θT smaller than a predetermined value. Detection of whether operation is in the deceleration-time slip range (i.e., the vehicle is in a decelerated operation state) is achieved by determining it on the basis of a speed NT of the turbine 25 and a throttle position θT as described above.

Transition-time control means 104 is also arranged, which is actuated upon transition to a deceleration-time slip control state from an operation state other than the deceleration-time slip control state to avoid a shock which would otherwise occur at the time of the transition.

The transition-time control means 104 is provided with non-direct connection state routing means 105 so that the damper clutch 28 is operated through a non-direct connection state to absorb a change in torque upon deceleration of the engine 10.

Figure 7:
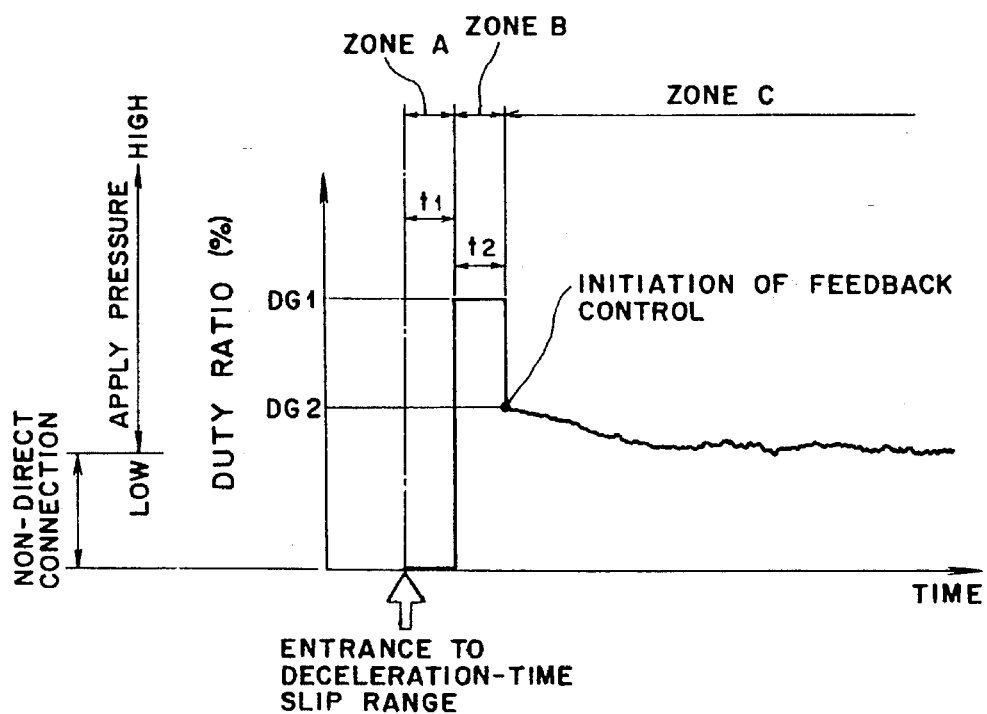
FIG. 7 is a diagram illustrating function of tightening hydraulic pressure feeding means.

As depicted in FIG. 7, zone A in which the duty ratio is maintained at 0% is provided for a predetermined time $t_1$ from the time of entrance to the deceleration-time slip range. In zone A, the non-direct connection state routing means 105 once brings the damper clutch 28 into a non-direct connection state so that a change in the engine torque due to a change in the throttle position is absorbed through a slip of the damper clutch 28.

Here, zone A is set, for example, at a time required for a single computing cycle by the control system or so.

The transition-time control means 104 is provided with transition-time non-direct connection eliminating means 106 which serves to eliminate in an early stage a non-direct connection state established by the non-direct connection state routing means 105.

Further, the transition-time non-direct connection eliminating means 106 is provided with tightening hydraulic pressure feeding means 107 for feeding a hydraulic pressure to directly connect the damper clutch 28 and also with tightening hydraulic pressure setting means 108 for setting a hydraulic pressure to be fed by the tightening hydraulic pressure feeding means 107.

The term "tightening hydraulic pressure" as used will next be defined. To bring a clutch into a non-direct connection state, a hydraulic pressure is applied to a release side of the clutch. Even if the application of this hydraulic pressure to the release side subsequent to the establishment of the non-direct connection state, a residual pressure still remain on the release side. Upon connection (either non-slip direct connection or slip connection) of the clutch subsequent to the non-direct connection, it is desired to feed an apply hydraulic pressure of appropriate level to an apply side of the clutch after elimination of the residual pressure on the release side. The term "tightening hydraulic pressure" means a hydraulic pressure which as described above, is fed to the apply side at the same level as the residual pressure so that the residual pressure on the release side is canceled by the tightening hydraulic pressure fed to the apply side. Incidentally, an unduly high "tightening hydraulic pressure" produces a shock upon engagement of the clutch while an unduly low "tightening hydraulic pressure" cannot cancel the residual pressure on the release side and cannot promptly bring the clutch into engagement. Accordingly, it is necessary to control the "tightening hydraulic pressure" to an appropriate level corresponding to the residual pressure on the release side.

As is illustrated in FIG. 7, subsequent to zone A in which the damper clutch 28 has been brought to the non-direct connection state, zone B is provided for a predetermined time $t_2$ in which a hydraulic pressure is fed at a duty ratio DG1 to the apply side. In zone B, the tightening hydraulic pressure feeding means 107 eliminates any residual pressure on the release side.

Further, the tightening hydraulic pressure setting means 108 is constructed in such a way that the setting of the duty ratio DG1 corresponding to the tightening pressure to be fed to the apply side is effected relying upon a turbine speed NT of the torque converter 20 and a throttle position θT of the engine 10 at the time immediately before entrance to the deceleration-time slip range (in other words, immediately before entrance to zone A).

Figure 8:
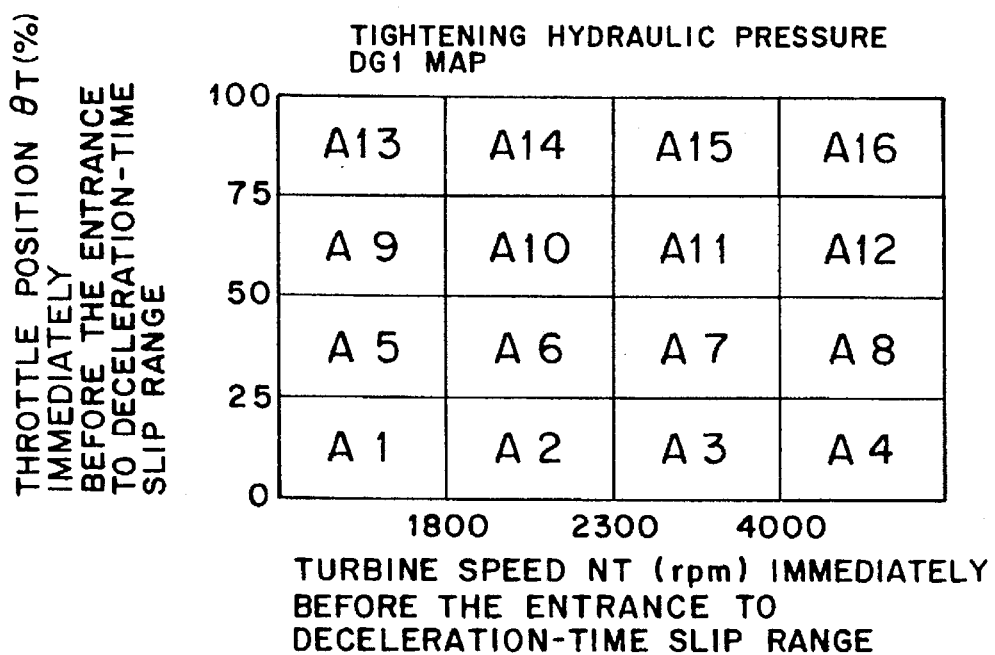
FIG. 8 is a map showing preset values of tightening hydraulic pressure as divided in accordance with the turbine speed and the throttle position, both immediately before entrance of a deceleration-time slip range.

FIG. 8 is a map in which preset values of tightening hydraulic pressure are divided. The entire operation range is divided into sections A1 to A16. For each of the sections, a preset value is stored. Each preset value is dependent on the turbine speed NT plotted along the axis of abscissas and the throttle position θT plotted along the axis of ordinates and has been determined to permit elimination of effects of any residual pressure left as a result of an apply pressure fed in the non-slip direct connection range or the slip connection range immediately before entrance to the deceleration-time slip range. In the illustrated embodiment, the duty ratio DG1 is set smaller as the turbine speed immediately before entrance to the deceleration-time slip range increases but is set greater as the throttle position immediately before entrance to the deceleration-time slip range increases. This tendency is observed consistently insofar as the damper clutch 28 is in a direct connection state upon entrance to the deceleration-time slip range. Incidentally, another amount indicating an engine load such as the amount of intake air per unit revolutions of the engine (A/N) may be used in place of the throttle position θT. Similarly, the vehicle speed may be used instead of the turbine speed NT.

A feedback control initiating hydraulic pressure 109, which is fed to directly connect the damper clutch 28 (to the apply side) so that feedback control can be initiated by the deceleration-time slip range control means 103, is determined depending on the turbine speed of the torque converter 20 and the throttle position of the engine 10 at the time of entrance to the deceleration-time slip range.

Figure 9:
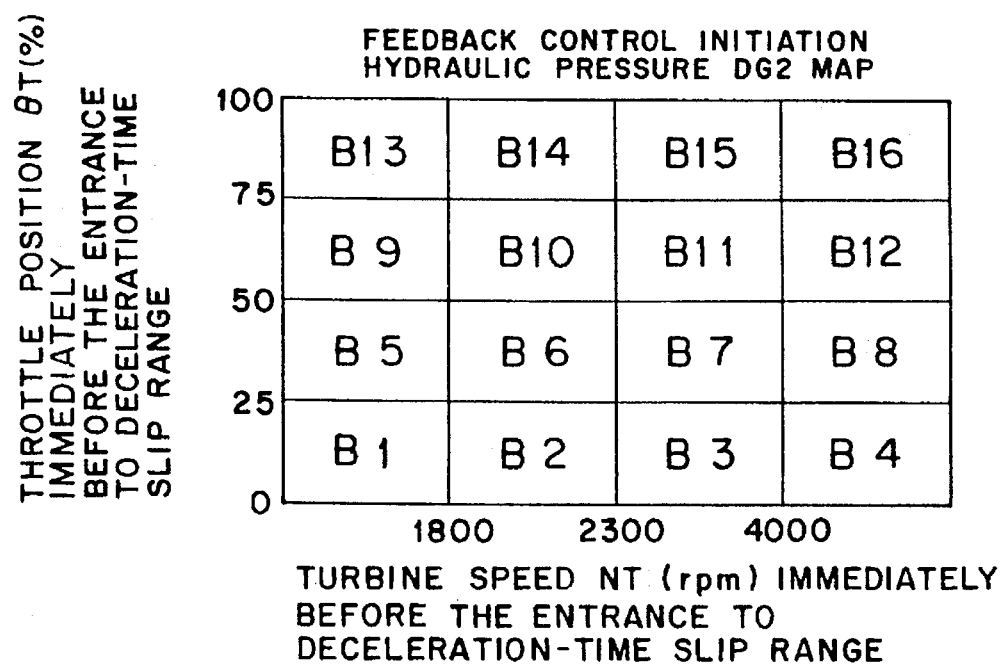
FIG. 9 is a map illustrating preset values of feedback control initiating hydraulic pressure as divided in accordance with the turbine speed and the throttle position, both immediately before entrance of a deceleration-time slip range.

FIG. 9 shows a map in which preset values of the feedback control initiating hydraulic pressure 109 are divided. The entire operation range is divided into sections B1 to B16. For each of the sections, a preset value is stored. Each preset value is dependent on the turbine speed NT plotted along the axis of abscissas and the throttle position θT plotted along the axis of ordinates and has been determined to permit determination of a duty ratio DG2, which is suited to achieve in a short time a target feedback value to converge, corresponding to an apply pressure fed in the non-slip direct connection range or the slip connection range immediately before entrance to the deceleration-time slip range. In the illustrated embodiment, the dependence of the duty ratio DG2 on the turbine speed NT is not so high as in the case of the duty ratio DG1 but is set at a slightly larger value as the turbine speed immediately before entrance to the deceleration-time slip range increases.

As an alternative, a preset constant value may be used as this duty ratio DG2 without using such a map. Like DG1, the duty ratio DG2 can also be determined using the amount of intake air (A/N) and the vehicle speed in place of the throttle position θT and the turbine speed, respectively.

Also arranged are initiating hydraulic pressure determining means 110 for determining upon feedback control by the deceleration-time slip range control means 103 if the feedback control initiating hydraulic pressure 109 is too high or too low, initiating hydraulic pressure correcting means 112 for correcting the next feedback control initiating hydraulic pressure 109 on the basis of the results of the determination by the initiating hydraulic pressure determining means 110, and feedback control interrupting means 111 for interrupting feedback control when occurrence of a shock is expected from the results of the determination by the initiating hydraulic pressure determining means 110.

Figure 10:
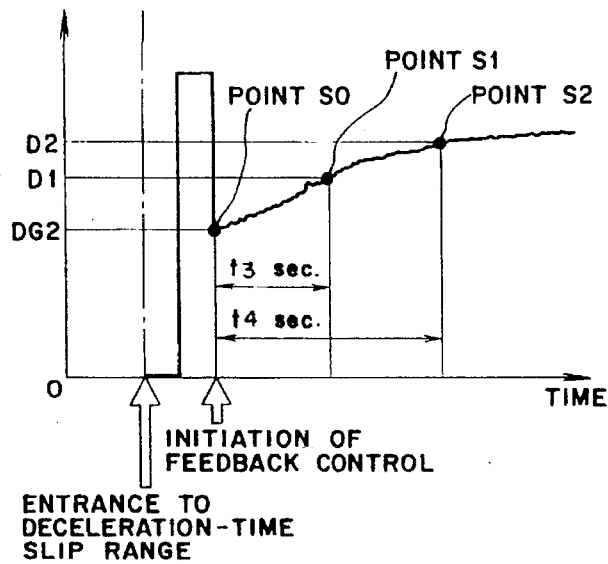
FIG. 10 is a diagram depicting variations in a duty ratio which is used to determine whether or not a feedback control initiating hydraulic pressure is appropriate.

The initiating hydraulic pressure determining means 110 is constructed to determine, by using a change in the duty ratio shown diagrammatically in FIG. 10, whether a feedback control initiating hydraulic pressure is adequate.

In FIG. 10, the duty ratio to which the hydraulic pressure to be fed to the damper clutch 28 is adjusted is plotted along the axis of ordinates, while time is plotted along the axis of

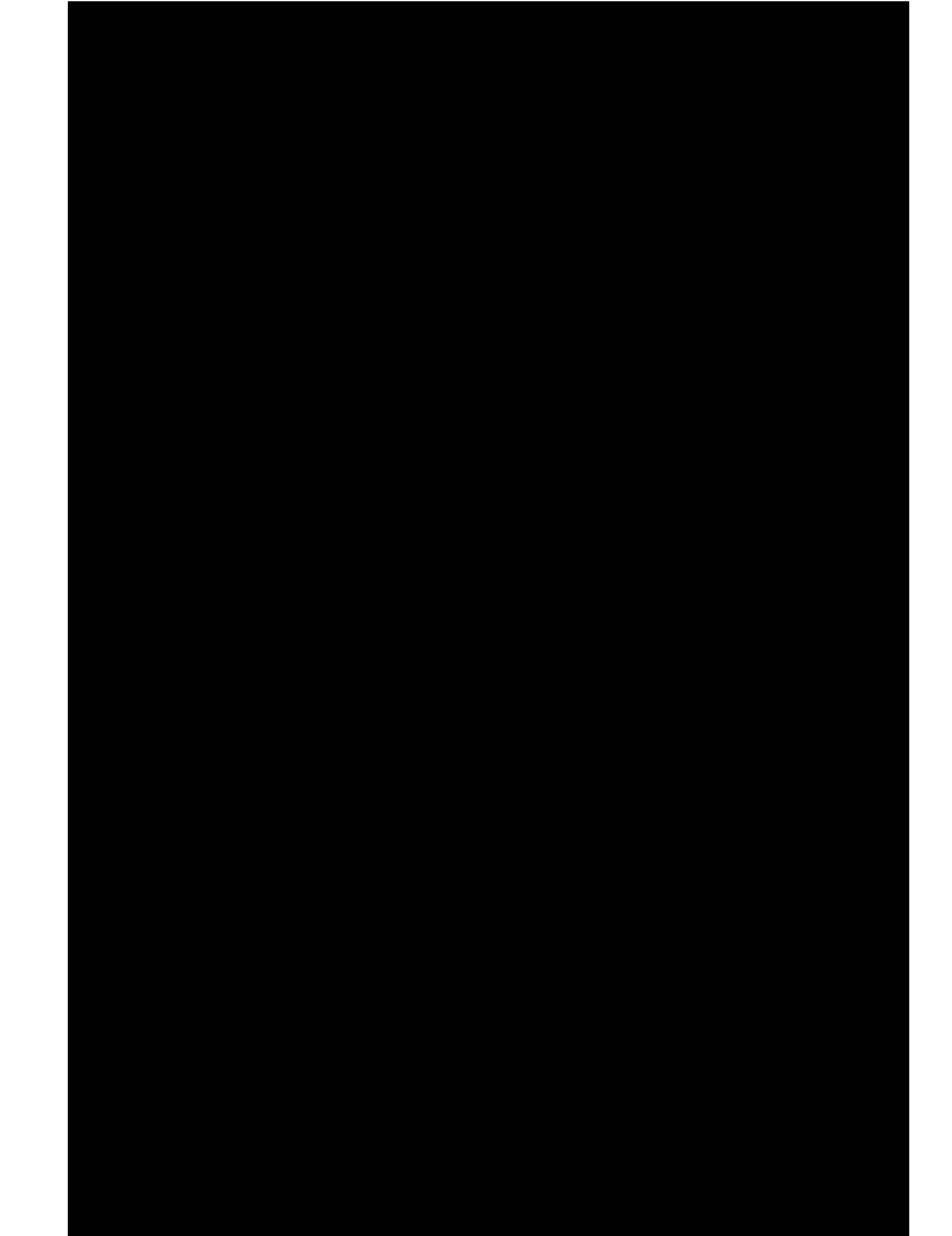

damper clutch control valve 52 and the line pressure of the line 58 is fed through the line 59 as an apply pressure for directly connecting the damper clutch 28.

At this time, the line 57 is communicated to an oil discharging side so that the working oil on the release side of the damper clutch 28 is discharged.

As a result, the damper clutch 28 is brought into a solid connection state by the non-slip direction control means 101 and the drive force of the internal combustion engine 10 is transmitted to a side of driven wheels primarily via the damper clutch 28.

In this state, a fuel cut (i.e., reduction) corresponding to an energy loss which would otherwise occur if the transmission of the drive force is performed via the torque converter 20 is conducted by the control system for the internal combustion engine 10, resulting in saving of fuel consumption.

Where a running state of the automotive vehicle is in the non-direct connection range in FIG. 6, the non-direct connection range control means 102 is actuated so that the damper clutch control solenoid valve 54 in the damper clutch hydraulic pressure control circuit 50 is driven by a control signal from TCU 16 to change over the damper clutch control valve 52 and the line pressure of the line 58 is fed through the line 57 as a release pressure for bringing the damper clutch 28 into a non-direct connection state.

At this time, the line 59 is communicated to the oil discharging side so that the working oil on the apply side of the damper clutch 28 is discharged.

As a result, the damper clutch 28 is brought into a non-direct connection state by the non-direct connection control means 102 and the drive force of the internal combustion engine 10 is transmitted to the side of the driven wheel primarily via the torque converter 20.

Since drive of the damper clutch control solenoid valve 54 is conducted at a predetermined duty ratio in response to a control signal from TCU 16, the damper clutch control valve 52 feeds the line pressure of the line 58 at predetermined pressures to the lines 57,59 so that the working pressure to be fed to the damper clutch 28 is regulated.

Here, the apply pressure in the non-slip direct connection control means 101 corresponds to 100% duty ratio or its proximal state while the apply pressure in the non-direct connection range control means 102 corresponding to a duty ratio of 0–30%, Where a running state of the automotive vehicle is in the slip range shown in FIG. 6, on the other hand, a predetermined apply pressure is applied to the damper clutch 28 owing to an adjustment to the duty ratio on the basis of a control signal from TCU 16, whereby the damper clutch 28 is brought into a desired slipping state.

As a result, the drive power of the internal combustion engine 10 is transmitted to the side of the driven wheels through both the damper clutch 28 and the torque converter 20.

In this state, a fuel cut (i.e., reduction) corresponding to drive power which is no longer transmitted through the torque converter 20 because of the transmission of the drive power through the damper clutch 28 is conducted by the control system for the internal combustion system 10. The fuel consumption is therefore reduced.

Figure 3:
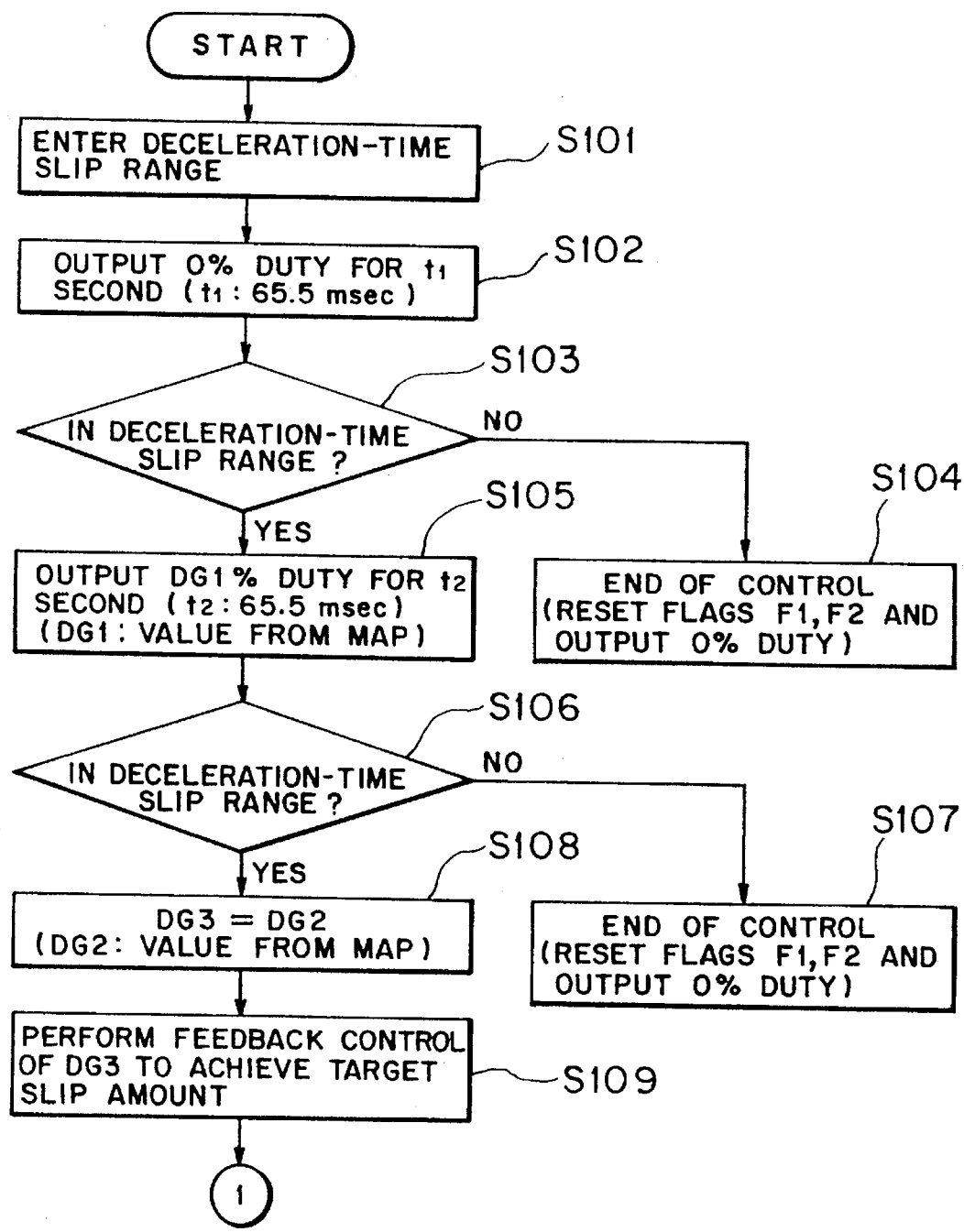
FIG. 3 is a flow chart for deceleration-time slip control, in which during decelerated operation of an automotive vehicle, a damper clutch is controlled into a desired slipping state by deceleration-time slip control means.
Figure 4:
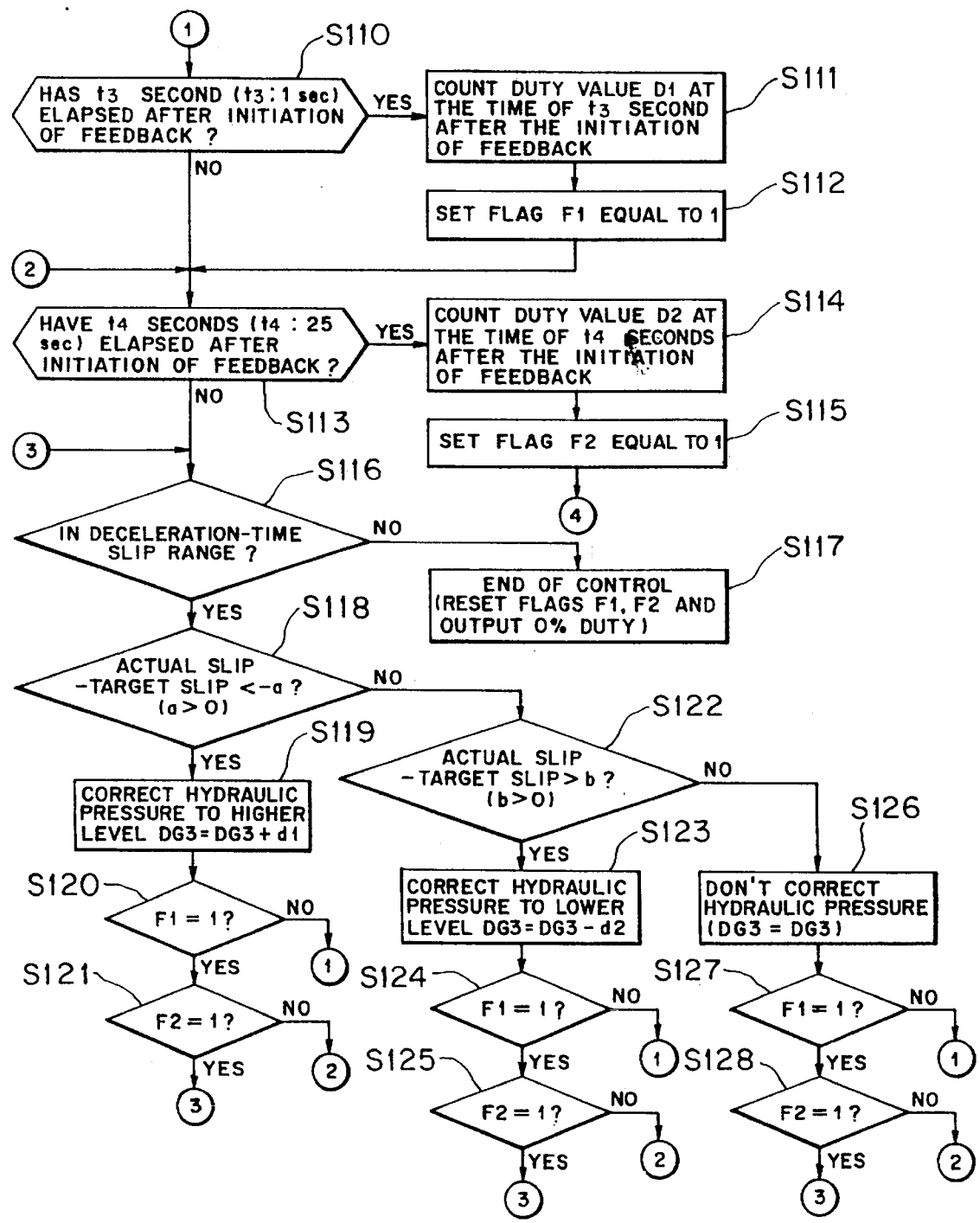
FIG. 4 is a flow chart showing feedback control of a duty ratio to make slip amount of the damper clutch closer to a target value.
Figure 5:
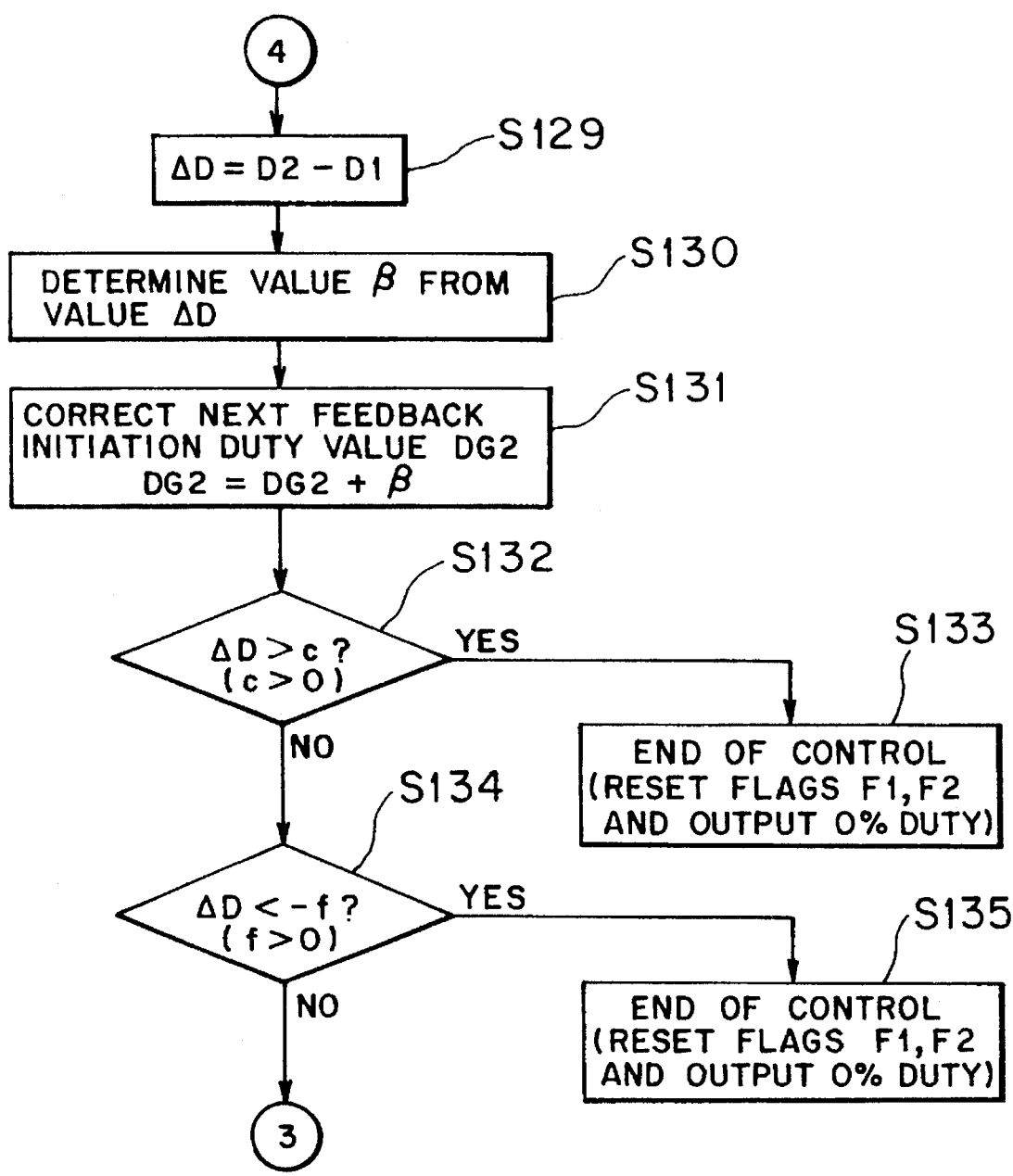
FIG. 5 is a flow chart for correcting a feedback control initiating hydraulic pressure based on a preceding change in duty ratio.

During decelerated operation of the automotive vehicle, the deceleration-time slip range control under which the damper clutch 28 is controlled in a desired slipping state is performed by the deceleration-time slip control means 103 in accordance with the flow charts shown in FIGS. 3 to 5.

First, when entrance to the deceleration-time slip range is detected as a result of determination of the operation range (step S101), the transition-time control means 104 is then actuated upon changing the control to the decelerated-time slip range control, so that deceleration-time clutch control is performed.

Incidentally, the determination of the operation range is conducted based on a turbine speed NT of the turbine 25 and a throttle position θT of the internal combustion engine 10 detected by the NT sensor 15 and the θT sensor 18, respectively, and inputted to TCU 16 while referring to the characteristics of FIG. 6 stored in TCU 16.

To operate the damper clutch 28 through a non-direct connection state by the non-direct connection state routing means 105, a control signal for setting at 0% duty ratio an apply pressure to be fed to the damper clutch 28 is outputted from TCU 16 to the damper clutch hydraulic pressure control circuit 50 for $t_1$ second from the entrance to the deceleration-time slip range (step S102).

For example, $t_1$ second may be set equal to the time period required for a single computing cycle.

As an alternative, $t_1$ second may also be set equal to the time period required for releasing the clutch at 0% duty ratio on the basis of the operation state of the vehicle immediately before entrance to the decelerated operation.

An operation state of the vehicle can be determined, for example, by a slip amount ($N_E$–$N_T$) and an engine load such as a throttle position. The time $t_1$ is determined in accordance with their amounts.

Upon changing the operation state, for example, to the deceleration-time slip range from the direct connection range where the direct connecting pressure is high, a shock can be avoided by making the time $t_1$ longer.

As a further alternative, the setting of this time $t_1$ can also be conducted using a map which permits determination of the time $t_1$ in accordance with the slip amount and the engine load.

As a result, the apply pressure to the damper clutch 28 is maintained at 0% duty ratio as shown in zone A in FIG. 7.

Under this non-direct connection state in zone A, a change in torque upon deceleration of the engine 10 is absorbed.

When the vehicle is brought into a decelerated state from a state in which the vehicle is running with the damper clutch 28 directly connected with or without slipping, the throttle position θT of the internal combustion engine 10 is returned to the fully-closed position and the damper clutch 28 is brought into the deceleration-time slip state. The vehicle is hence operated in such a way that the side of the engine 10 is driven by the side of the driven wheels, thereby making it possible to reduce the fuel to be fed to the engine 10.

When the throttle position θT is returned to the fully-closed position, however, a change in torque takes place in the output from the internal combustion engine 10 and this change is directly transmitted to the gear-box 30 through the turbine 25. A shock or judder therefore occurs.

The change to the deceleration-time slip mode cannot therefore be performed smoothly, leading to a failure in achieving the deceleration-time slip control. Under the non-direct connection state in zone A, however, a change in torque upon deceleration of the engine 10 can be absorbed so that transmission of the change to the gear-box 30 can be avoided.

As a result of the operation through the non-direct connection state by the non-direct connection state routing means 105, it is now possible to smoothly achieve the change to the deceleration-time slip mode. Deceleration-time slip control can therefore be performed.

The non-direct connection state created by the non-direct connection state routing means 105 is then eliminated in an early stage by the transition-time non-direct connection eliminating means 105.

This can be effected by performing step S105 with the use of the non-direct connection state routing means 105 after confirming in step S103 of the control flow of TCU 16 if the vehicle is in the deceleration-time slip range.

Described specifically, a tightening hydraulic pressure DG1 is set by the tightening hydraulic pressure setting means 108 of the transition-time non-direct connection eliminating means 106 while relying upon a turbine speed NT of the torque converter 20 and a throttle position θT of the engine 10 at the time of the entrance to the deceleration-time slip range.

This is conducted by choosing one of the divided characteristics A1 to A16 of FIG. 8, which are stored in TCU 16, based on the turbine speed NT of the torque converter 20 and the throttle position θT of the engine 10 at the time of the entrance to the deceleration-time slip range and then reading as the tightening hydraulic pressure DG1 the characteristic value the so-selected divided characteristics from the memory.

The tightening hydraulic pressure DG1 so set is fed by the tightening hydraulic pressure feeding means 107 to directly connect the damper clutch 28.

As is shown in zone B of FIG. 7, the apply pressure to the damper clutch 28 is held at a hydraulic pressure corresponding to the duty ratio DG1 for $t_2$ second.

This duty ratio DG1 is set at a value capable of promptly eliminating the non-direct connection state achieved by the non-direct connection state routing means 105, and is dependent on the state immediately before the entrance to the deceleration-time slip range.

For a tightening hydraulic pressure DG1 corresponding, for example, to a change from a section in the non-slip direct connection range, in which section the throttle position θT is large and the turbine speed NT is also high, the duty ratio of an upper right section as viewed in FIG. 8 is set smaller than that of a lower left section in view of a residual pressure on the apply side.

A tightening hydraulic pressure DG1 corresponding to a change from a non-direct connection range is generally large because the pressure in the damper clutch 28 is basically low, and is set at a larger value as the change is from a section of a smaller value in the throttle position θT.

Operation by the transition-time control means 104 is performed as described above, and the feedback control by the deceleration-time slip range control means 103 is next initiated.

In step S108 of the control flow for TCU 16, the feedback initiating hydraulic pressure 109 is first set relying upon a turbine speed NT of the torque converter 20 and a throttle position θT of the engine 10 as detected at the time of entrance to the deceleration-time slip range.

This is conducted by selecting one of the divided characteristics B1 to B16 of FIG. 9, which have been stored in TCU 16, on the basis of the turbine speed NT of the torque converter 20 and the throttle position θT of the engine 10 as detected at the time of the entrance to the acceleration-time slip range and then reading, as a duty ratio DG2 of the feedback control initiation hydraulic pressure, the characteristic value of the so-selected divided characteristics from the memory.

The thus-set duty ratio DG2 of the feedback control initiating hydraulic pressure is adjusted by a control signal from TCU 16 and then fed to directly connect the damper clutch 28, whereby the feedback control in zone C shown in FIG. 7 is initiated.

From the non-direct connection state achieved by the non-direct connection state routing means 105 and the results of control by the transition-time non-direct connection eliminating means 106, the duty ratio DG2 of this feedback control initiating hydraulic pressure is set to smoothly bring the subsequent feedback control into a converged state. The duty ratio DG2 is dependent on the state immediately before the entrance to the deceleration-time slip range.

In view of a residual pressure still remaining on the apply side, a feedback control initiating hydraulic pressure DG2 corresponding to a change from the nonslip direct connection range of the section B15 or B16 where the throttle position θT is large and the turbine speed NT is also high is set greater than a feedback control initiating hydraulic pressure DG2 corresponding to a change from the non-direct connection range of the section B13 or B14 where the turbine speed NT is low.

The feedback control of the damper clutch 28 is initiated in this manner. To avoid occurrence of a stall or a shock during this control, it is determined by the initiating hydraulic pressure determining means 110 if the feedback control initiating hydraulic pressure DG2 is too high or too low. Based on the results of the determination by the initiating hydraulic pressure determining means 110, correction of the next feedback control initiating hydraulic pressure DG2 is conducted by the initiating hydraulic pressure correcting means 112.

Where occurrence of a shock is expected based on the results of a determination by the initiating hydraulic pressure determining means 110, on the other hand, the feedback control is interrupted by the feedback interrupting means 111.

This will hereinafter be described specifically. In the control flow of TCU 16, the duty ratio DG2 of the feedback control initiating hydraulic pressure in the current control cycle is first read in step S108 as DG3 for use as a variable upon making a correction subsequently.

As will be described subsequently herein, the duty ratio DG2 is corrected through learning but the correction value β is stored separately. Accordingly, the correction value β is read concurrently with reading of DG2 as DG3 and DG3 is set as a learned value.

By executing step S109 onwards, the feedback control of the duty ratio DG3 is then performed to make the slip amount of the damper clutch 28 closer to a target value.

Namely, it is determined in step S118 whether or not the actual slip amount at the damper clutch 28 is smaller than the target slip amount by a predetermined value "−a" (a>0), in other words, whether or not the actual slip amount is smaller than a level which is smaller by "a" than the target slip amount. If so, step S119 is executed to effect a correction to the duty ratio DG3 under the feedback control so that the duty ratio DG3 is increased by a predetermined value d1.

On the other hand, it is determined in step S122 whether or not the actual slip amount at the damper clutch 28 is greater than the target slip amount by a predetermined amount "b" (b>0). If so, step S123 is executed to effect a correction to the duty ratio DG3 under the feedback control so that the duty ratio DG3 is decreased by a predetermined value d2.

Where the actual slip amount falls in a predetermined up-and-down range of the target slip amount (i.e., in a range from a level smaller by the predetermined value "a" to a level greater by the predetermined value "b"), the routine advances taking the "NO" route in each of step S118 and step S122 and without effecting any correction in step S126 to the duty ratio DG3 under the feedback control, returns to step S116 through a branch route ③ and operations similar to the preceding feedback control are repeated.

Where the duty ratio DG3 under the feedback control is corrected in step S119 or step S123, on the other hand, the duty ratio DG3 so corrected is outputted to the damper clutch hydraulic pressure control circuit 50 so that a corrected apply pressure is fed to the damper clutch 28. Even if the duty ratio DG3 under feedback control is not corrected in step S126, the duty ratio DG3 is of course outputted to the damper clutch hydraulic pressure control circuit 50 so that an apply pressure is fed to the damper clutch 28 without any correction.

The routine advances through step S120, step S121, step S124, step S125, step S127 and step S128 and then returns to step S116 through the branch route ③, whereby the determinations in step S119 and S112 and the corrections to the duty ratio DG3 in steps S119, S123 and S126 are performed repeatedly.

Where the answer is "NO" in other words, flag F1≠1 in each of step S120, step S124 and step S127, the routine returns to step S110 through a branch route ①. Where the answer is "NO" namely F1≠1 in each of step S121, step S125 and step S128, the routine returns to step S113 through a branch route ②.

When the vehicle is no longer in the deceleration-time slip range, the routine takes the "NO" route in step S116 and the feedback control is completed (steps S117, S104 and S107). This applies equally to steps S103 and S106.

The feedback control of the damper clutch 28 is performed as described above. To avoid occurrence of a stall or shock in the course of the control, it is determined by the initiating hydraulic pressure determining means 110 if the feedback control initiating hydraulic pressure DG2 is too high or too low.

Namely, the initiating hydraulic pressure determining means 110 performs the following operations in accordance with the control flow of TCU 16.

First, it is repeatedly determined in step S110 whether or not a predetermined time $t_3$ (for example, $t_3 = 1$ second) has elapsed from the initiation of the feedback control. The duty ratio D1 immediately after the elapse is counted (step S111), and flag F1 which indicates counting of the duty ratio D1 is set at "1" (step S112).

Further, it is repeatedly determined in step S113 whether or not a predetermined time $t_4$ (for example, $t_4 = 2.5$ seconds) has elapsed from the initiation of the feedback control. The duty ratio D2 immediately after the elapse is counted (step S114), and flag F2 which indicates counting of the duty ratio D2 is set at "1" (step S115).

These duty ratios D1,D2 so counted correspond to the duty ratios at points S1,S2 shown in FIG. 10 and are adopted as characteristic values indicating the progress of the feedback control.

After completion of the counting of the duty ratio D2, the routine returns through a branch route ④ to execute step S129 shown in FIG. 5.

The change $\Delta D$ (= D2–D1) from the duty ratio D1 to the duty ratio D2 is calculated in step S129 to determine if the feedback control initiating hydraulic pressure DG2 is too high or too low.

Figure 11:
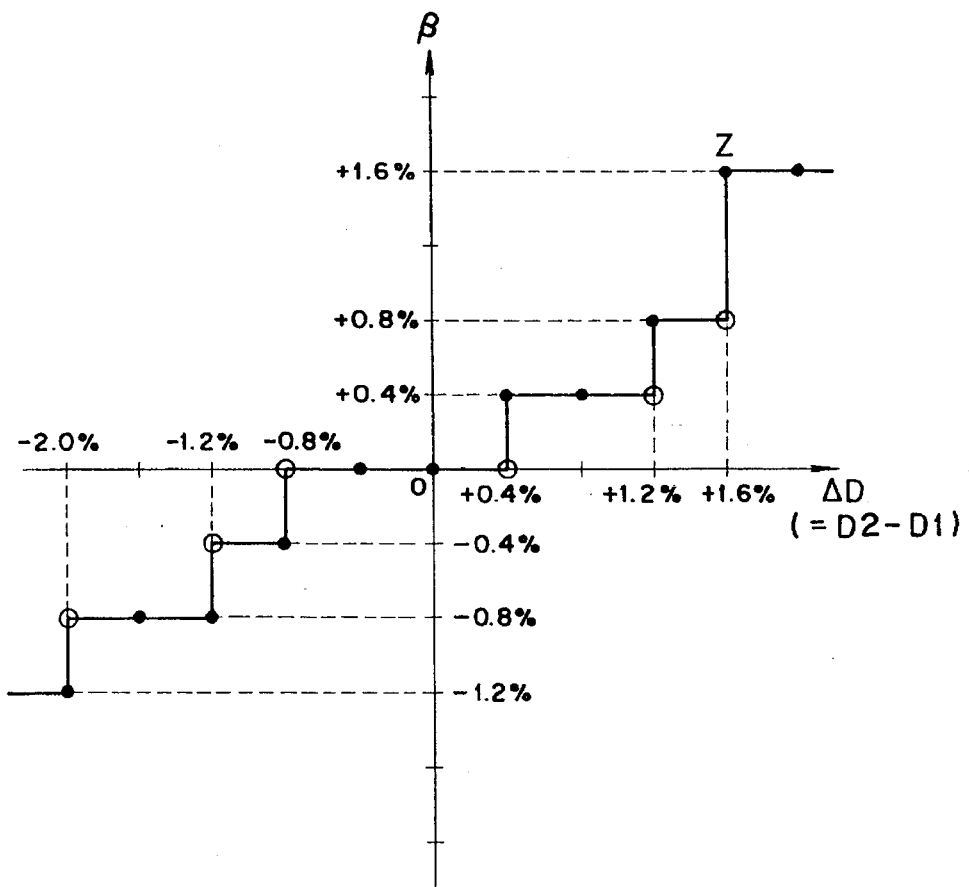
FIG. 11 is a diagram showing correction characteristics for variations in the duty ratio.

Based on the deviation of the change $\Delta D$ in the duty ratio, a correction value $\beta$ is read from the map, which stores the characteristics of FIG. 11, for use in the correction of the feedback control initiating hydraulic pressure DG2 in the next feedback control (step S130).

In step S131 which is executed by the initiating hydraulic pressure correcting means 112, the correction value $\beta$ is added to the duty ratio DG2 of the feedback control initiating hydraulic pressure in the current feedback control so that the duty ratio DG2 (= DG2+$\beta$) of the feedback control initiating hydraulic pressure for the next feedback control is determined.

As a consequence, a control signal is outputted from TCU 16 to the damper clutch hydraulic pressure control circuit 50 and upon initiation of the next feedback control, an apply pressure corresponding to the duty ratio DG2 so corrected is fed to the damper clutch 28.

Since the duty ratio DG2 is a so-called map value preset in the memory as described above, the correction value $\beta$ is not written directly in the map but is retained in another memory arranged to store the correction value $\beta$.

In the present embodiment, the correction value $\beta$ for the predetermined duty ratio DG2 is determined and is also applied to all duty ratios DG2. It is however possible to compute and set a correction value for each duty ratio.

Accordingly, the feedback control initiating duty ratio DG2(n) for the $n^{th}$ deceleration-time slip control is expressed by the above formula (5).

By the above-described correction, the following advantageous effects can be brought about.

The characteristics of the correction value $\beta$ in FIG. 11 comprise stepwise characteristics such that for a given change $\Delta D$ in the duty ratio, a correction value $\beta$ is set at a value smaller than a correction value which would be obtained if the correction value $\beta$ had linear characteristics (i.e., the characteristics extending from point O to point Z in FIG. 11).

Where the change $\Delta D$ in the duty ratio is 0.4% or greater but is smaller than 1.2%, for example, the correction amount $\beta$ is set at 0.4% so that compared with a duty ratio change $\Delta D$ close to 1.2%, the correction amount so set is smaller by about 0.8%.

Assuming that the hydraulic pressure on the apply pressure side in the above feedback control has become higher, for example, by 5% or more than a hydraulic pressure to be converged in the feedback control. If sudden brakes are applied on a low-μ road at this time point, release of a direct connection state of the damper clutch 28 is delayed and the engine speed NE is lowered, resulting in the potential problem that the engine may stall. The correction value $\beta$ is however set at a smaller value so that the apply pressure is controlled lower, thereby making it possible to avoid occurrence of a stall or shock.

As is understood from the setting of the duty ratio DG2 at point SO shown in FIG. 10, the duty ratio DG2 of the feedback control initiating hydraulic pressure is set lower than that of a hydraulic pressure to be converged and is designed in such a way that the apply pressure gradually increases by the subsequent feedback control. It is therefore always possible to obtain the advantage that the above-mentioned apply pressure is controlled low and occurrence of a stall or shock is prevented.

Where the change $\Delta D$ in the duty ratio is found to be greater than a predetermined value "c" (c>0) or smaller than a predetermined value "–f" (f>0) by the feedback control interrupting means 111 in steps S132 and S134, the feedback control is however interrupted (steps S133 and S135).

If the working hydraulic pressure drops beyond a necessary value or despite the respective controls described above, becomes too high in the feedback control, the feedback control is therefore interrupted so that occurrence of a shock in the drive system or occurrence of a stall is prevented.

When the working hydraulic pressure in the feedback control becomes lower in duty ratio by 5% or more than a power-off state in the deceleration-time slip range so that the stability of the control is much higher. The deceleration-time slip range is therefore extremely suited for a correction through learning and each learnt value has high accuracy.

Next, TCU 16 determines in step S52 whether or not the current operation state is in the slip range. When the determination results in "NO", the deceleration-time slip control is completed in step S53. The damper clutch control solenoid valve 54 is driven depending on the control range.

When the determination in step S52 gives "YES", the slip control routine advances to step S54, where it is determined whether or not the difference between an actual slip amount and a target slip amount is greater than a threshold e (in this embodiment, 10 rpm). When this determination leads to "YES" TCU 16 performs a correction in step S55 to add a predetermined value $d_3$ to the duty ratio DG4, whereby the apply pressure to the damper clutch 28 is increased to reduce the slip amount. The routine thereafter returns to step S51 to output the duty ratio DG4. In the slip range with the drive system maintained in a power-on state, the engine speed NE is obviously always higher than the turbine speed NT in contrast to the situation in the deceleration-time slip range.

When the determination in step S54 gives "NO", the slip control routine advances to step S56, where it is determined whether or not the difference between an actual slip amount and a target slip amount is smaller than a threshold h (in this embodiment, −10 rpm). When this determination leads to "YES" a correction is performed in step S57 to subtract a predetermined value $d_4$ from the duty ratio DG4, whereby the apply pressure to the damper clutch 28 is reduced to make the slip amount greater. The routine thereafter returns to step S51 to output the duty ratio DG4.

When the determination in step S56 results in "NO", the actual slip amount is determined to lie in an appropriate range so that in step S58, the duty ratio DG4 is set at the same value as the preceding duty ratio. No correction is therefore made to the hydraulic pressure to be fed to the damper clutch 28, and the routine then returns to step S51 to output the duty ratio DG4.

It is to be noted that the present invention is not limited to the above embodiment. For example, the damper clutch control solenoid valve arranged in the damper clutch hydraulic pressure control circuit is duty-driven to obtain a desired apply pressure in the above embodiment. As an alternative, a proportional solenoid valve or the like can be used. As a further alternative, it is also possible to drive a control valve by a motor or the like. Further, the specific procedures of the control can be modified as needed within a scope not departing from the spirit of the present invention.

As has been described above, the deceleration-time slip mode or the slip mode can be achieved in a short time after initiation of the feedback control by correcting an excess or deficiency in the apply pressure at the time of initiation of the feedback control in the deceleration-time slip control and using the learning results for the apply pressure at the time of initiation of the feedback control in the slip control. It is therefore possible to substantially improve the fuel consumption.

What is claimed is:

1. A method for controlling an engagement state of a clutch for connecting an input shaft of a fluid coupling and an output shaft of the fluid coupling, the fluid coupling provided between an engine of a vehicle and a transmission, the engine having a fuel cut mechanism for suspending a supply of fuel thereto when an engine load decreases, comprising:

(a) detecting said engine load;

(b) releasing said clutch when said engine load decreases;

(c) determining an amount of pressure to be applied to said clutch to move said clutch toward an engaging side and obtain an initial engagement therein;

(d) applying said determined amount to said clutch; and (e) executing a feedback control of said clutch after obtaining said initial engagement for maintaining a desired rotational speed difference between said input and output shafts of said fluid coupling.

2. The method of claim 1 further comprising: (f) detecting a speed of said vehicle; and wherein said step (c) comprises (c1) determining, from a map, said amount of pressure based on said detected speed and said detected engine load.

3. The method of claim 1 further comprising: (f) detecting a rotational speed of said output shaft; and wherein said step (c) comprises (c1) determining, from a map, said amount of pressure based on said detected rotational speed and said detected engine load.

4. A method for controlling an engagement state of a clutch for connecting an input shaft of a fluid coupling and an output shaft of the fluid coupling, the fluid coupling provided between an engine and a transmission, the engine having a fuel cut mechanism for suspending a supply of fuel thereto when an engine load decreases, comprising:

(a) detecting said engine load;

(b) releasing said clutch when said engine load decreases;

(c) moving said clutch toward an engaging side thereof;

(d) determining a feedback control initiating pressure to be applied to said clutch at an initiation of a feedback control for maintaining a desired rotational speed difference between said input shaft and said output shaft of said fluid coupling based on an operating condition of said vehicle at a time immediately before said engine load decreases;

(e) applying said determined feedback initiating pressure to said clutch after moving said clutch toward said engaging side; and (f) executing said feedback control after applying said feedback control initiating pressure to said clutch.

5. The method of claim 4, further comprising: (g) detecting a speed of a vehicle; and wherein said step (d) comprises (d1) determining said feedback control initiating pressure based on said detected speed and said detected engine load.

6. The method of claim 4, further comprising: (g) detecting a rotation speed of said output shaft of said fluid coupling; and wherein said step (d) comprises (d1) determining said feedback control initiating pressure based on said detected rotation speed and said detected engine load.

7. A method for controlling an engagement state of a clutch for connecting an input shaft of a fluid coupling and an output shaft of the fluid coupling, the fluid coupling provided between an engine and a transmission, the engine having a fuel cut mechanism for suspending a supply of fuel thereto when an engine load decreases, comprising:

(a) detecting said engine load;

(b) releasing said clutch when said engine load decreases;

(c) moving said clutch toward an engaging side thereof;

(d) determining a first feedback control initiating pressure to be applied to said clutch after said engine load decreases to maintain a desired rotational speed difference between said input shaft and said output shaft of said fluid coupling;

(e) applying said determined first feedback initiating pressure to said clutch after moving said clutch toward said engaging side;

(f) executing a first feedback control after applying said determined first feedback initiating pressure to said clutch; and (g) correcting and storing said first feedback control initiating pressure based on parameters of said first feedback control.

8. The method of claim 7, wherein said step (g) comprises (g1) detecting a first control value obtained upon an elapse of a first predetermined period of time after initiation of said first feedback control;

(g2) detecting a second control value obtained upon an elapse of a second predetermined period of time longer than said first predetermined period of time after initiation of said first feedback control;

(g3) calculating a correction value based on a difference between said first control value and said second control value; and (g4) correcting and storing said first feedback control initiating pressure to be used as said first feedback control initiating pressure in a subsequent first feedback control based on said calculated correction value.

9. The method of claim 8, wherein said step (g) further comprises (g5) suspending said feedback control when said calculated difference is equal to or greater than a predetermined value.

10. The method of claim 7, further comprising:

(h) executing a second feedback control for maintaining a desired rotational speed difference between said input shaft and said output shaft of said fluid coupling before said engine load decreases; and wherein said step (h) comprises (h1) determining a second feedback control initiating pressure to be applied to said clutch at an initiation of said second feedback control based on said corrected and stored first feedback control initiating pressure.

11. The method of claim 10, wherein said step (h1) comprises (h11) determining said second feedback control initiating pressure such that said second feedback control initiating pressure is less than said first feedback control initiating pressure by a predetermined amount.

12. A method for controlling an engagement state of a clutch for connecting an input shaft of a fluid coupling and an output shaft of the fluid coupling, the fluid coupling provided between an engine and a transmission, the engine having a fuel cut mechanism for suspending a supply of fuel thereto when an engine load decreases, comprising:

(a) detecting said engine load;

(b) determining, from a map, a time period for releasing said clutch based on a rotational speed difference between said input shaft and said output shaft of said fluid coupling and said engine load immediately before said engine load decreases;

(c) releasing said clutch for said determined time period;

(d) moving said clutch toward an engaging side thereof; and (e) executing a feedback control for maintaining a desired rotational speed difference between said input and output shafts of said fluid coupling after moving said clutch toward said engaging side.

13. A clutch engagement state control apparatus, comprising:

a fluid coupling having an input shaft connected to an engine and an output shaft connected to a transmission, said engine having a fuel cut mechanism for suspending a supply of fuel thereto when an engine load decreases;

a clutch disposed between said input shaft and said output shaft;

an engine load detector detecting said engine load;

a non-direct connection state routing unit releasing said clutch when said detected engine load decreases;

a determining unit determining an amount of pressure to be applied to said clutch to move said clutch toward an engaging side thereof to obtain an initial engagement;

a pressure feeding unit feeding said determined amount of pressure to said clutch; and a feedback control unit executing a feedback control after obtaining said initial engagement to maintain a desired rotational speed difference between said input and output shafts of said fluid coupling.

14. A clutch engagement state control apparatus of claim 13, further comprising:

a vehicle speed sensor detecting a speed of a vehicle on which said fluid coupling is mounted; and wherein said determining unit comprises a map for determining said amount of pressure based on said detected speed and said detected engine load.

15. A clutch engagement state control apparatus of claim 13, further comprising:

a rotational speed sensor detecting a rotational speed of said output shaft; and wherein said determining unit comprises a map for determining said amount of pressure based on said detected rotational speed and said detected engine load.

16. A clutch engagement state control apparatus, comprising:

a fluid coupling having an input shaft connected to an engine and an output shaft connected to a transmission, said engine having a fuel cut mechanism for suspending a supply of fuel thereto when an engine load decreases;

a clutch disposed between said input shaft and said output shaft;

an engine load detector detecting an engine load;

a non-direct connection state routing unit releasing said clutch when said detected engine load decreases;

a first pressure feeding unit moving said clutch toward an engaging side thereof;

a determining unit determining a feedback control initiating pressure to be applied to said clutch to maintain a desired rotational speed difference between said input shaft and said output shaft of said fluid coupling based on an operating condition of said vehicle at a time immediately before said engine load decreases;

a second pressure feeding unit applying said determined feedback initiating pressure to said clutch after moving said clutch toward said engaging side; and a feedback control unit executing a feedback control after obtaining said initial engagement and after applying said determined feedback control initiating pressure to said clutch.

17. A clutch engagement state control apparatus of claim 16, further comprising:

a speed sensor detecting a speed of a vehicle; and wherein said determining unit comprises an initiating pressure determining unit determining said feedback control initiating pressure based on said detected speed and said detected engine load.

18. A clutch engagement state control apparatus of claim 16, further comprising:

a rotation speed sensor detecting a rotation speed of said output shaft of said fluid coupling; and wherein said determining unit comprises an initiating pressure determining unit determining said feedback control initiating pressure based on said detected rotation speed and said detected engine load.

19. A clutch engagement state control apparatus, comprising:

a fluid coupling having an input shaft connected to an engine and an output shaft connected to a transmission, said engine having a fuel cut mechanism for suspending a supply of fuel thereto when an engine load decreases;

a clutch disposed between said input shaft and said output shaft;

an engine load detector detecting an engine load;

a non-direct connection state routing unit releasing said clutch when said detected engine load decreases;

a first pressure feeding unit moving said clutch toward an engaging side thereof;

a determining unit determining a first feedback control initiating pressure to be applied to said clutch after said engine load decreases to maintain a desired rotational speed difference between said input shaft and said output shaft of said fluid coupling;

a second pressure feeding unit applying said determined first feedback initiating pressure to said clutch after moving said clutch toward said engaging side;

a feedback control unit executing a first feedback control after obtaining said initial engagement after applying said determined first feedback control initiating pressure to said clutch; and a correcting and storing unit correcting and storing said first feedback control initiating pressure based on parameters of said first feedback control.

20. A clutch engagement state control apparatus of claim 19, wherein said correcting and storing unit comprises a first control value detecting unit detecting a first control value obtained upon an elapse of a first predetermined period of time after initiation of said first feedback control;

a second control value detecting unit detecting a second control value obtained upon an elapse of a second predetermined period after initiation of said first feedback control, said second predetermined period of time being longer than said first predetermined period of time;

a calculating unit calculating a correction value based on a difference between said first control value and said second control value; and a learning unit correcting and storing said first feedback control initiating pressure to be used as said first feedback control initiating pressure in a subsequent first feedback control based on said calculated correction value.

21. A clutch engagement state control apparatus of claim 20, wherein said correcting and storing unit further comprises a suspending unit suspending said first feedback control when said calculated difference is equal to or greater than a predetermined value.

22. A clutch engagement state control apparatus of claim 19, further comprising:

a control unit executing a second feedback control for maintaining a desired rotational speed difference between said input shaft and said output shaft of said fluid coupling before said engine load decreases; and wherein said control unit comprises an initiating pressure determining unit determining a second feedback control initiating pressure to be applied to said clutch at an initiation of said second feedback control based on said corrected and stored first feedback control initiating pressure.

23. A clutch engagement state control apparatus of claim 22, wherein said initiating pressure determining unit determines said second feedback control initiating pressure such that said second feedback control initiating pressure is less than said first feedback control initiating pressure by a predetermined amount.

24. A clutch engagement state control apparatus, comprising:

a fluid coupling having an input shaft connected to an engine and an output shaft connected to a transmission, said engine having a fuel cut mechanism for suspending a supply of fuel thereto when as engine load decreases;

a clutch disposed between said input shaft and said output shaft;

an engine load detector detecting an engine load;

a speed difference detection unit detecting a rotation speed difference between said input shaft and said output shaft of said fluid coupling;

a determining unit determining, from a map, a time period for releasing said clutch based on said detected rotational speed difference and said detected engine load obtained immediately before said engine load decreases;

a non-direct connection state routing unit releasing said clutch for said determined time period;

a pressure feeding unit moving said clutch toward an engaging side thereof after said determined time period; and feedback control unit executing a feedback control for maintaining a desired rotational speed difference between said input shaft and said output shaft of said fluid coupling after moving said clutch toward said engaging side.

* * * * *